United States Patent [19]
Suzuki et al.

[11] Patent Number: 6,123,457
[45] Date of Patent: Sep. 26, 2000

[54] LINEAR MOTION GUIDE UNIT

[75] Inventors: Osamu Suzuki; Takashi Yatsu, both of Kanagawa, Japan

[73] Assignee: Nippon Thompson Co., Ltd., Tokyo, Japan

[21] Appl. No.: 09/144,852

[22] Filed: Sep. 1, 1998

[30] Foreign Application Priority Data

Sep. 9, 1997 [JP] Japan .................................. 9-259441

[51] Int. Cl.$^7$ .................................................. F16C 29/06
[52] U.S. Cl. .................... 384/13; 384/45; 184/5
[58] Field of Search .......................... 384/13, 15, 43, 384/44, 45; 184/5, 100

[56] References Cited

U.S. PATENT DOCUMENTS 3,804,203   4/1974   Koschmieder et al. .
5,547,285   8/1996   Hutzel et al. .............................. 384/15

FOREIGN PATENT DOCUMENTS 4141038    6/1993   Germany .
6-346919   12/1994  Japan .
7-035146   2/1995   Japan .
8-200362   8/1996   Japan .
8-247144   9/1996   Japan .
8-247145   9/1996   Japan .
61-283634  12/1996  Japan .
9-053637   2/1997   Japan .
9126235    5/1997   Japan .
9152095    6/1997   Japan .

*Primary Examiner*—Thomas R. Hannon
*Attorney, Agent, or Firm*—Browdy and Neimark

[57] ABSTRACT

A linear motion guide unit track rail has lengthwise side surfaces with first and second raceway grooves in which a slider moves. Lubrication is provided in the slider for the raceway grooves of the track rail. The lubricator has a lubricant case. Lubricant delivery to the raceway grooves includes a head in sliding contact with the first raceway grooves and a leg, integral with the head, and extending through an opening into the case. The leg is inserted into the case through an elastic mouthpiece, and the head is elastically urged towards the raceway grooves of the track rail by the elastic mouthpiece.

13 Claims, 6 Drawing Sheets

LINEAR MOTION GUIDE UNIT

FIELD OF THE INVENTION

The present invention relates to a linear motion guide unit applicable to robots, semiconductor manufacturing apparatus, machine tools and the like, with lubricating means easy to mount to the unit.

DESCRIPTION OF THE RELATED ART

The recent remarkable development in mechatronics technology requires linear motion guide units of improved precision, speed, and miniaturization. The use of such apparatus extends into many technical fields. Linear motion guide units are, in general employed in semiconductor manufacturing apparatus, measuring instruments, industrial robots and the like. For instance, robots for assembling are now manufactured in various types from large scale to miniature in accordance with expanded usage. The linear motion guide units to be incorporated in such assembling robots are required to meet needs of self lubrication as well as high precision, high speed and miniaturization.

A conventional linear motion guide unit, as shown in FIG. 10, has a sliding element, or slider 1, straddling a track rail 2 so as to freely move along with respect to the track rail by virtue of elements 7 rolling along the raceway grooves 4 on the rail 2. The track rail 2 has, on lengthwise side surfaces 3 thereof, raceway grooves 4 and it has on a lengthwise upper surface 14 openings 13 spaced from each other. The track rail 2 is to be fixed to a mounting base 20 (beds, platforms, work tables or the like). The track rail 2 is fixed, together with the mounting base 20, by screwing bolts through the openings 13 of the track rail 2 and openings in the mounting base 20.

The slider 1 has a casing 5 movable with respect to the track rail 2, and end caps 6 attached to the opposing ends of the casing 5. Provided on the upper surface of the casing 5 are openings for a fixture, other appliances, parts, chucks, grasping jaws or the like. Both casing 5 and the end caps 6 are formed on lower surfaces thereof with recesses 10 by which the casing 5 and end caps 6 may straddle track rail 2 for free movement. The recesses 10 are each formed with a raceway groove 9 in opposition to one of the raceway grooves 4 on the track rail 2. The rolling elements, or balls 7, are confined for free movement in raceways defined by the raceway grooves 4 and 9. Retainer bands 18 are provided in the casing 5 so as to surround the balls 7 to prevent the balls 7 from falling out of the casing 5. Bottom seals 8 are secured to the lower surfaces of the slider 1 for sealing between the track rail 2 and the slider 1.

The end caps 6 are provided with claws for scooping up the balls 7 from the raceway grooves 4 forming the loaded track regions of the track rail 2. The end caps have direction-changing passages for circulating movement of the balls 7. Mounted on the end caps 6 are end seals 17 for sealing between the track rail 2 and the lengthwise opposing ends of slider 2. The end caps 6 are secured to the opposing ends of the casing 5 by means of bolts 25 screwed into fixture openings fixture. The balls 7 move along the loaded regions, that is, the raceway grooves 4 of the track rail 2, and then come into the direction changing passages in the end caps 6. The balls 7 then move to the return passages 12 which are formed in the casing 5 in parallel with the raceway grooves 9. Thus the balls 27 circulate though the raceways, direction changing passages, and return passages 12. As a result, the slider 1 moves smoothly relative to the track rail 2 by the action of the movement of the balls 27 along the raceway defined by the raceway grooves 4 and 9 of the track rail 2 and slider I. Grease nipples 11 are provided on the end caps 6, and bores through the end seals 17 and end caps 6, for feeding lubricating oil to the raceway grooves 4, 9 in which the balls 7 are held for free movement.

Prior sealing means for linear motion guide unit are disclosed in Japanese Patent Application Laid Open Nos. 346919/1994, 35146/1995, 200362/1996, 247144/1996, 247145/1996 and 53637/1997.

Disclosed in Japanese Patent Application Laid-Open No. 346919/1994 is a sealing means for a side seal and an under seal secured to the slider in the linear motion guide unit, in which seal lips made of rubber or synthetic resin are provided for closing tightly clearances between the slider and the track rail. The lip seals keep in contact with the outer surfaces of the rail, and contain therein lubricant being constantly, continuously oozed from the seal lips to the locations to be lubricated.

Shown in Japanese Patent Application No. 283634/1986 is a method of producing sintered material of continuous porosity, which comprises the steps of mixing powdered polyethylene of ultrahigh molecular weight and powdered molding agent of polyolefin resin at a pre-determined ratio, and sintering the mixture to thereby produce porous sintered material having therein continuous porosity of average pore diameter of from 10 to 150 g m and average porosity of from 25 to 45% by volume.

In the prior linear motion rolling guide unit shown in FIG. 10, lubricating oil or grease is, in general, used as lubricant. Grease is fed from grease nipples 11 to the raceways for the balls. Alternatively, lubricating oil is from the external piping through pipe joints attached to the slider. The slider conventionally has end seals for prevention of contamination by dust and other impurities, the end seals being made of core metal and rubber material such as acrylonitrile-butadiene rubber.

Linear motion guide units have recently come into common use over a wide area, under an adverse situation where it's next to impossible to feed lubricant, or under severe environmental conditions where the units may be covered with a large quantity of dust or chips and where it is difficult to control the temperature. It is thus required to provide a linear motion guide unit which is free of lubrication maintenance.

The sealing means for linear motion guide units, disclosed in Japanese Patent Application Laid-Open No. 346919/1994 has end seals made of rubber or synthetic resin containing lubricant. Disclosed in Japanese Patent Application Laid-Open No. 200362/1996 is an end seal made of polymer material containing lubricant.

Further disclosed in Japanese Patent Application Laid-Open Nos. 346919/1994, 200362/1996 and 53637/1996 is a sealing means made of lubricant-immersed polymer material which is manufactured by the steps of melting a mixture of olefinic polymer with poly(a -olefin) oil, pouring the mixture into a mold and solidifying the molded mixture by cooling. It, however, has required complicated, advanced technical skill.

Any kind of prior linear motion guide units may be periodically supplied with grease or lubricating oil through the grease nipples or pipe joints, when the units are used under ordinary conditions. But these guide units are apt to be short of lubricant under severe operating conditions such as in dusty environments, at high speed and continuous operation for many hours, or under adverse situations such as lubricant supply difficulty. It is in general desirable that the guide units be free from maintenance indefinitely. In the prior linear motion guide units provided with lubricant immersed polymer material, disclosed in the citation above, they are under a restrictive standard as to lubricant and thus could not manufactured freely in accordance with user's requirement and could not be replenished freely with lubricant. As a result, the users were unwillingly compelled to throw away the guide units after use.

SUMMARY OF THE INVENTION

An object of the present invention is to overcome the shortcomings described above with reference to the prior art, and to provide a linear motion guide unit having lubricating means in which any kind of lubricant may be contained and the lubricant may be replenished after being used up.

Another object of the present invention is to provide a linear motion guide unit capable of self lubrication even under severe operating condition so as to be kept in good lubrication.

A further object of the present invention is to provide lubricating means for linear motion guide unit, which is applicable to the unit with only minor design modification.

A further object of the present invention is a linear motion guide unit, having lubricating means, which achieves a long life-time by self-lubrication, has improve protection against dusty environment, operate maintenance-free, and is easy for production.

The present invention relates to a linear motion guide unit comprising a track rail provided on lengthwise side surfaces thereof with first raceway grooves, a sliding element movable relative to the track rail and having second raceway grooves in opposition to the first raceway grooves, and lubricating means provided in the sliding means for lubricating the first raceway grooves of the track rail, wherein the lubricating means is composed of a case and lubricant delivery means of the case, and the lubricant delivery means make sliding contact with the first raceway grooves of the track rail to thereby supply the lubricant to the first raceway grooves of the track rail.

With the sliding movement of the lubricating means with respect to the track rail, the lubricant is drawn out of the case by virtue of the lubricant delivery means so as to be applied to the track rail. The sliding movement of the sliding element along the lubricated track rail causes an automatic supply of the lubricant to rolling elements in the sliding element, so that the sliding element may move smoothly with respect to the track rail.

The case of the lubricating means is mounted on the sliding element so that the lubricating means is disposed for sliding movement along the track rail.

Alternatively, the case of the lubricating means may be attached to a mounting base which is secured to the sliding element which is movable along the track rail. Further, it can be designed that the sliding elements are secured to the mounting base so as to arrange the lubricating means between the sliding elements. Upon the mounting base moving with the sliding element, the lubricating means moves relative to the track rail to thereby feed lubricant to the raceway grooves. Alternatively, the lubricating means may be disposed for sliding movement independently of and between the sliding elements which are arranged side by side with each other. With the sliding elements moving along the track rail, they can abut with any one of the sliding elements. The lubricating means moves with the sliding elements to lubricate the raceway grooves of the track rail. In alternative embodiments, it is preferred to remove from the sliding element an end seal thereof opposed to the lubricating means for easy delivery of lubricant into the sliding element.

The sliding element is composed of a casing provided with raceway grooves in opposition to the raceway grooves on the track rail, rolling elements movable in raceways defined by the opposing raceway grooves, and end caps and end seals disposed on the lengthwise opposing ends of the casing. Provided on the outer surface of any one of the end caps is a case lubricating means case on which any one of the end seals is secured, such that the lubricating means is sandwiched between the end cap and the end seal.

Fixing of the end caps, end seals and case to the casing of the sliding element is made by screwing bolts into openings of the casing through aligned openings in the end caps, end seals, and case, or through collars fitted in the openings of the case.

To improve the assembly efficiency the fixing design may use screwing bolts through the end caps, end seals and case, on securing the lubricating means between the end caps and end seals. The collars arranged in the openings of the case are preferable to protect the case against tightening force by the bolts. The openings for bolts are to be arranged at corners to reserve a space as large as possible for lubricant.

The case has a port which serves as a lubricant feed port and a vent hole. When the lubricant is consumed, the case may be replenished with lubricant through the feed port. The lubricant feed port simultaneously serves as a vent hole for induction of air into the case, in proportion to the consumption of lubricant, to eliminate negative pressure in the case.

The delivery means for lubricant is made of porous sintered synthetic resin in which lubricant may ooze through pores to be fed to the raceway grooves.

The sintered synthetic resin is fabricated by filling a mold with fine powdered synthetic resin of a predetermined grading, selected from polyethylene of low density, high density or ultrahigh molecular weight, polypropylene, poly (methyl methacrylate) and tetrafluoroethylene, and heating the molded synthetic resin. The sintered synthetic resin has open pores with three dimensional network structure.

The delivery means for lubricant comprises a head having a surface for sliding movement in contact with the raceway grooves of the track rail, and a leg integral with the head and extending into the case through an opening thereof. The lubricant contained in the case permeates the head through the leg extended in the case, and then oozes from the head to the raceway grooves of the track rail.

While the leg of the delivery means is held in the case against rotation, the head of the delivery means matches in its configuration, the cross-section of the raceway grooves, which will correspond with the configuration of the rolling element. In case the rolling element is a ball, the raceway groove has an arc cross-section, whereas the rolling element of a roller conforms to a rectangular cross-section of the raceway groove.

The head of the delivery means should have an outer surface configuration corresponding to the cross section of the raceway groove, which cross section is determined according to the configuration of the rolling element. For instance, in case the rolling element is a ball, the delivery means has the outer surface shaped as an arc in the cross section perpendicular to the direction along the raceway groove, whereas a roller results in the outer surface being a rectangle in cross section. In an embodiment where the delivery means are provided at the ends of the sliding element in opposition to each other with respect to the sliding direction, the raceway grooves are sealed up between the heads of the delivery means. The leg of the delivery means is inserted in the case through the opening, for axial movement and against rotation. The axial movement of the leg makes possible easy assembly of the delivery means with the sliding element. After assembly is completed, the head is held securely against rotation.

Elastic packing members are provided in each opening of the case through which the leg of the delivery means is inserted in the case. The elastic members are to tightly seal up between the openings and the legs for the prevention of lubricant leakage out of the case.

The elastic packing members each also forcibly urge the head of the delivery means against the raceway groove of the track rail for steady feed of lubricant to the raceway groove of the track rail.

The lubricant used is ordinarily grease or oil. The lubricant is mixed with powdered resin, powdered metal or felt to be oozed constantly through the delivery means.

According to the linear motion guide unit constructed as described above, the lubricant contained in the cases of the lubricating means fed little by little to the raceway grooves of the track rail by means of the delivery means which are provided to the cases and kept in sliding contact with the raceway grooves of the track rail.

The lubricant, having been fed to the raceway grooves, lubricates the rolling elements and the raceways defined by the raceway grooves of the track rail and sliding elements so that the sliding element may move smoothly with respect to the track rail.

The linear motion guide unit of the present invention has the advantage that the lubricant fed little by little to the raceways maintains good lubrication without fear of lack of lubricant whereby the frictional resistance between the track rail and sliding element is steadily reduced. The combination of the lubricant with the delivery means may be designed for easy permeation of the lubricant into the delivery means of porous sintered resin, in conformity of the lubricant with the sintered resin. The lubricating means has the advantages that the kind of lubricant may be selected in accordance with the user's requirements, the replenishment of lubricant is easy, and it is easy to make handling and specification changes.

The lubricating means of the present invention further may be incorporated in a conventional guide unit without substantial changes in principal specification. That is, this lubricating means may be widely applicable to linear motion guide units having the track rail equal to the standard, because the case and the lubricating means thereof may be commonly employed even if the sliding element is different in type and size. In order to improve the self-lubrication performance of the guide units already having been used in machining tools or the like, the lubricating means may also be mounted to the conventional guide units which have been incorporated in machining tools because they can be attached easily to the end of the sliding element. Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
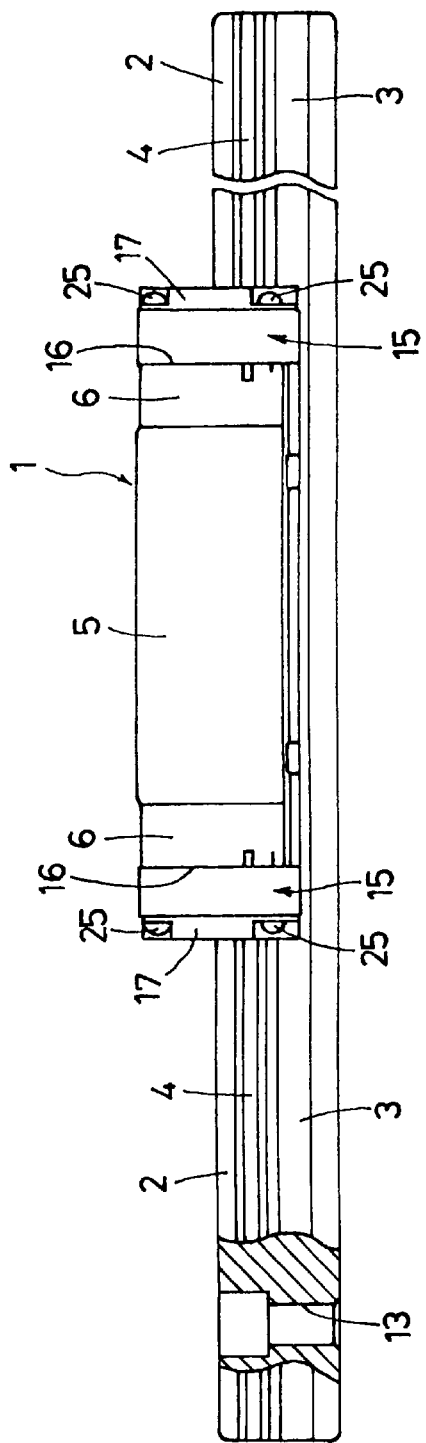
FIG. 1 is a side elevation view showing a preferred embodiment of a linear motion guide unit according to the present invention.

Referring now in detail to the drawings, the linear motion guide unit according to the present invention will be explained below, wherein like parts in each of the several figures are identified by the same reference character.

Figure 2:
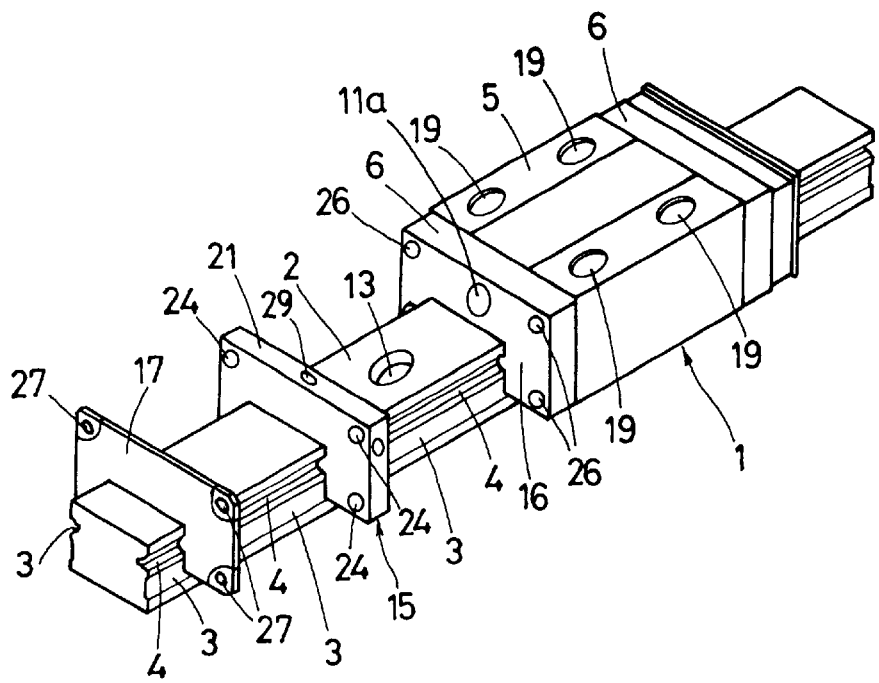
FIG. 2 is an exploded perspective view of the linear motion guide unit shown in FIG. 1.
Figure 3:
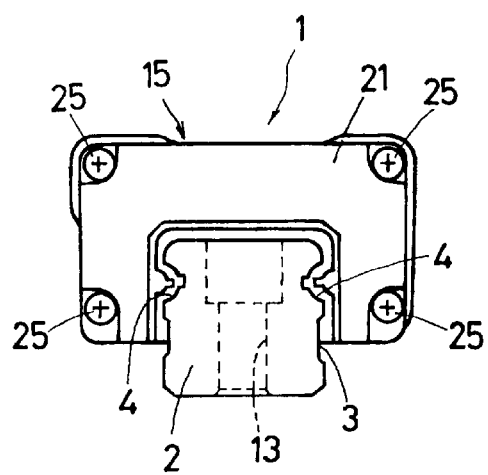
FIG. 3 is a front elevation view of the linear motion guide unit shown in FIG. 1.
Figure 4:
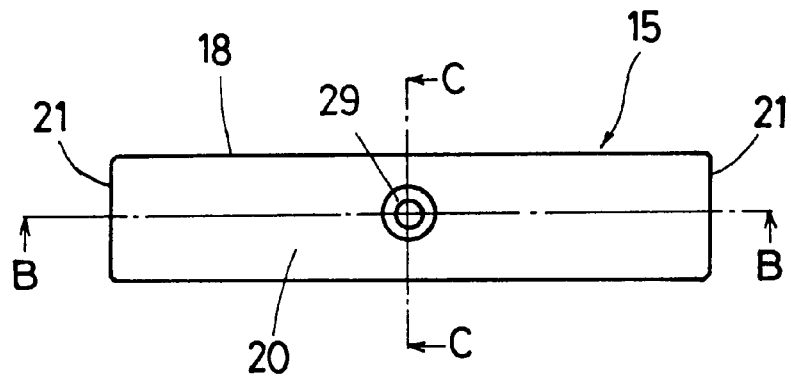
FIG. 4 is a plane view showing an embodiment of lubricating means to be incorporated in the linear motion guide unit shown in FIG. 1.
Figure 5:
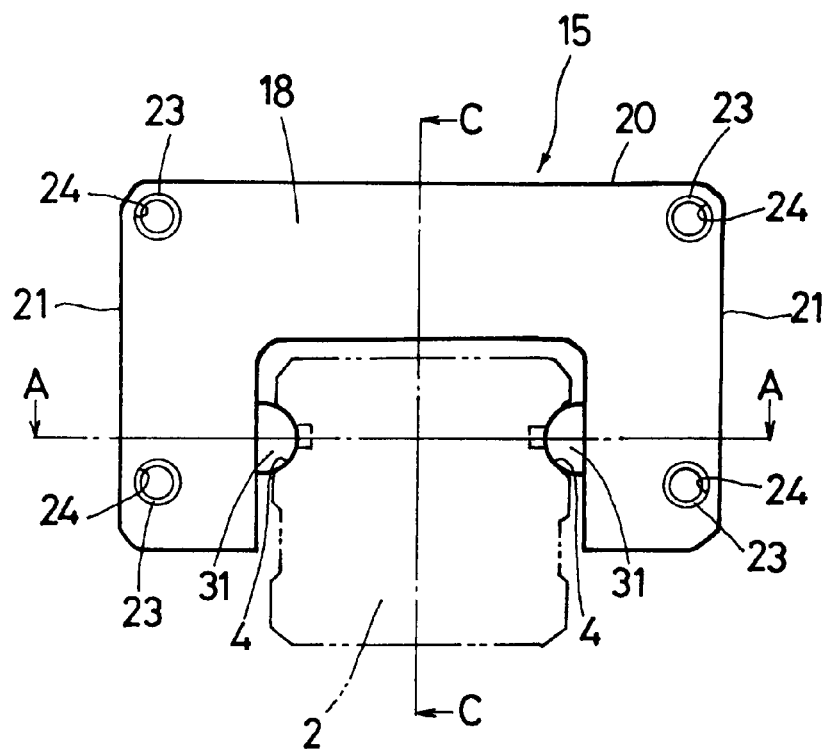
FIG. 5 is a front elevation view of the lubricating means shown in FIG. 4.
Figure 6:
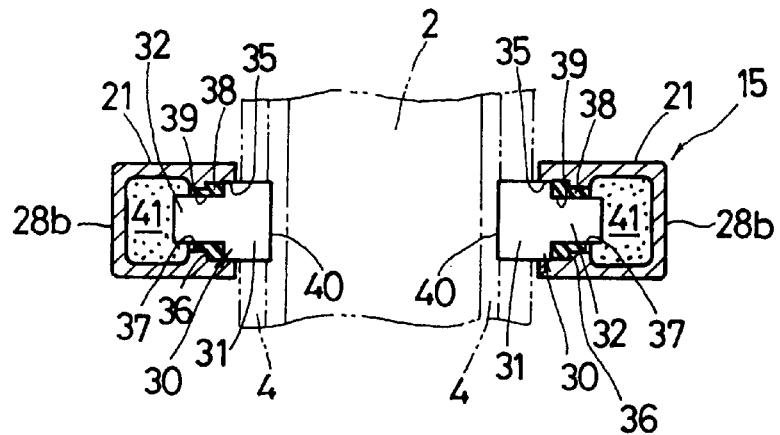
FIG. 6 is a sectional view of the lubricating means taken along the line A—A of FIG. 5.
Figure 7:
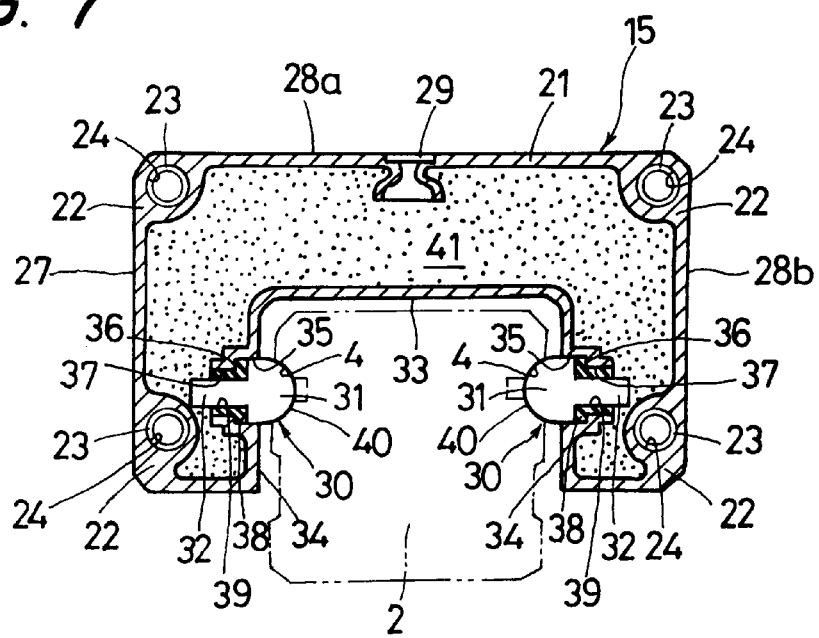
FIG. 7 is a sectional view of the lubricating means taken along the line B—B of FIG. 4.
Figure 8:
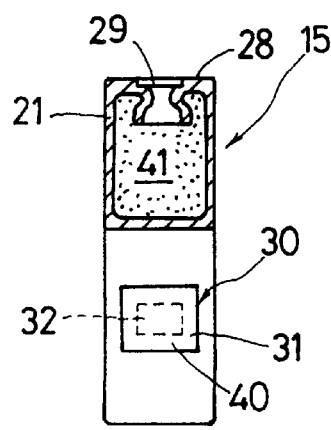
FIG. 8 is a sectional view of the lubricating means taken along the line C—C of FIGS. 4 and 5.

The linear motion guide unit of the preferred embodiment shown in FIGS. 1 to 3 primarily comprises a track rail 2 provided on its lengthwise opposing side surfaces 3 with raceway grooves 4, a sliding element, or a slider 1, saddling (straddling) on the track rail 2 for sliding movement. It will be seen that the track rail 2 is of a rectangular configuration in cross section, wherein the lengthwise opposing side surfaces 3 are recessed at the raceway grooves 4. The slider 1 is composed of a casing 5 movable with respect to the track rail 2, and end caps 6 secured to the ends of the casing 5, which ends are opposed lengthwise or along the moving direction of the slider 1.

Figure 10:
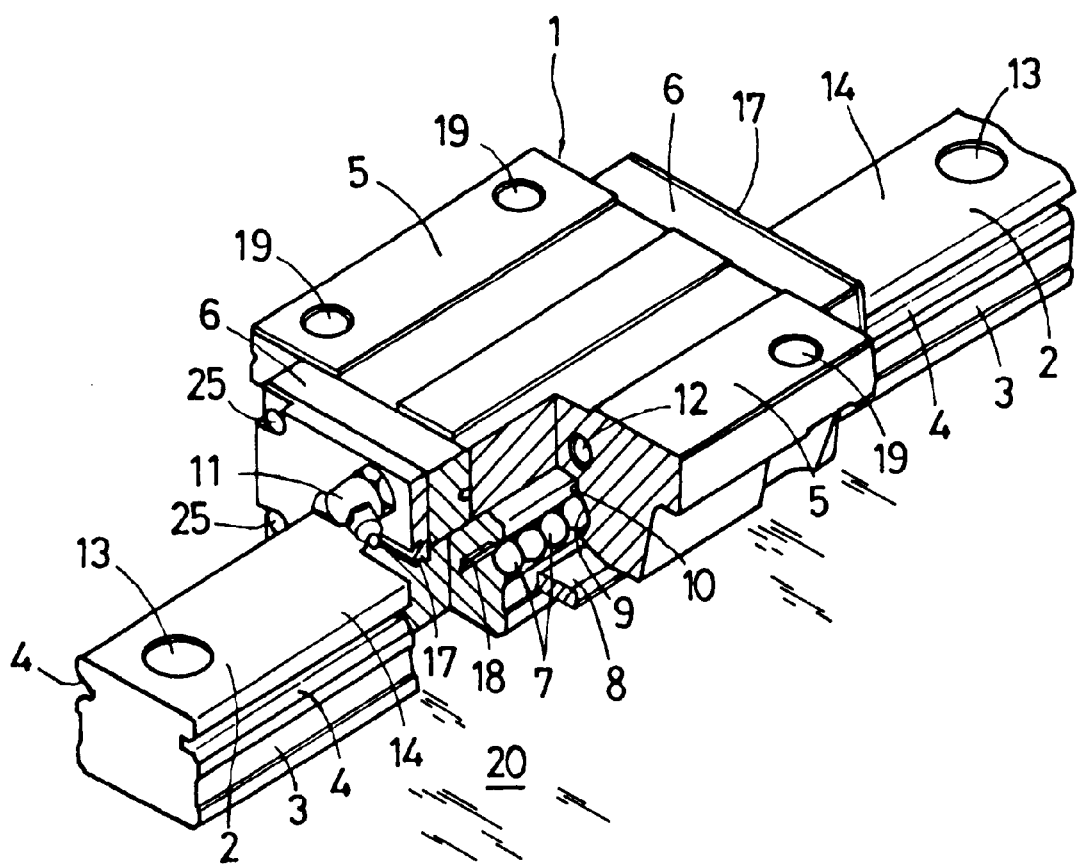
FIG. 10 is a partially cutaway perspective view showing a prior linear motion guide unit.

The slider 1 is similar or identical in its structure with the slider shown in FIG. 10, except for the lubricating means 15. It will be noted that the casing 5 has raceway grooves 9 in opposition to the raceway grooves 4, and rolling elements 7 are confined for free rotational movement in the space defined between the opposing raceway grooves 4 and 9. Retainer bands 18 are provided in the casing 5 so as to surround the rolling elements 7 for preventing the rolling elements from falling off the casing 5. Bottom seals 8 are provided on the lower surfaces of the end caps 6 as well as the casing 5 for sealing up the clearances between the lengthwise side surfaces 3 of the track rail 2 and both of the casing 5 and end caps 6. The slider 1 may move freely by virtue of the rolling elements 7 that move in a circulating manner along the raceway grooves 4 of the track rail 2. The rolling elements 7, running through the raceway grooves 4 of the track rail 2 under load, are introduced in direction-changing passages formed in the end caps 6 and then move into return passages 12 that are formed in parallel with the raceway grooves in the casing 5. As a result, the rolling elements may move in a circulating manner. The slider 1 makes the free sliding movement relative to the track rail 2 by virtue of the rolling motion of the rolling elements between the opposed raceway grooves 4, 9 of the track rail 2 and the slider 1.

The linear motion guide unit of the present invention has the feature that lubricating means 15 are arranged on the end surfaces 16 of the end caps 6 for sliding movement along the track rail 2. Also provided on the lubricating means are end seals 17 for sliding movement relative to the track rail 2. The lubricating means 15 comprises a case 21 for containing therein lubricant such as grease, lubricating oil or the like, which is poured through a port 29 into the case 21, and a pair of lubricant delivery means inserted in the case 21 through openings opposed to the raceway grooves 4 of the track rail 2. The cases 21, as a whole, are a vessel of gate-like configuration, and thin. The case 21 may be made of metals or synthetic resins. The case 21 is provided at a top wall 28a thereof with a port 29 which serves as a lubricant feed port and a vent hole. When the lubricant is being consumed, the case 21 may be replenished with lubricant through the feed port 29. The lubricant feed port 29 simultaneously serves as a vent hole for induction of air into the case 21, in proportion to the consumption of lubricant. Alternatively, the port 29 may be at a side 28b, instead of the top wall 28a.

The case 21 is reinforced at four corners 22 thereof, where openings 24 are provided for bolts 25 in order to fix the cases 21 to the end surfaces 16 of the end caps 6 that are mounted to the opposing ends of the casing 5. The end caps 6 and end seals 17, between which the cases 21 are to be sandwiched, have openings 26, 27 for the bolts 25 in alignment with the openings 24 of the case 21. It will be understood that all of the end caps 6, cases 21 and end seals 17 are integrally secured to the slider 1 in such a manner that the cases 21 are sandwiched between the end caps 6 and the end seals 17 by means of the bolts 25 which go through the openings 26, 24 and 27 of the end caps 6, cases 21 and end seals 17 and screw down to the casing 5 of the slider 1.

If the case 21 is made of synthetic resin, it is preferred to dispose collars 23 in the openings 24 for protection the cases 21 from adverse deformation due to the tightening forces of the bolts 25, which force will be caused by screwing the bolts 25 against the slider 1. The tightening forces of the bolts 25 may be partially shared by the collars 23 disposed at the four corners of the case 21. With the slider 1 having been assembled, the cases 21 seal up openings 11a which have been provided for grease nipples in the conventional design.

Contained in the case 21 may be lubricant alone or a mixture of lubricating oil with subsidiary material. Grease is typical of lubricant to be used alone. It is to be noted that grease of high viscosity is not desired because of difficult permeation of such lubricant into the delivery means. It is preferred to employ grease having consistency no. 1, for example, lithium grease. When the case 21 contains therein the mixture of lubricant with subsidiary material, the lubricant flows out of the delivery means depending on the particle density of lubricant. To cope with a flow problem, the powdered resin to be mixed with lubricant may be selected to have a fine grain size of 30 micrometers, intermediate grain size of 100 micrometers, or coarse grain size of from 250 to 300 micrometers, as the operating condition may demand. An example of powdered resin of fine grain size is ultrahigh molecular weight polyolefin. The lubricant mixed with the powdered resin of fine grain size may be oozed constantly through the delivery means. Alternatively, metal powder or felt may be used as the subsidiary material of the present invention.

The delivery means 30 is composed of porous sintered high polymer resin. The porous sintered synthetic resin is fabricated by filling a mold with powdered low-density synthetic resin of a predetermined grading, for example, fine grain size of 30 tLm or coarse grain size of from 250 g m to 300 g m, and heating the molded synthetic resin under pressure. The sintered synthetic resin has open pores in a three-dimensional network structure. The lubricant contained in the porous sintered resin may ooze from the pores in the sintered resin.

The delivery means 30 for lubricant comprises a head 31 having a surface 40 for sliding movement in contact with the raceway grooves 4 of the track rail 2, and a leg 32 integral with the head 31 and extending into the cavity 41 of case 21. The head 31 is of the semicylindrical shape in correspondence with the rolling elements, or balls, 7. The lubricant or lubricating oil contained in the cavity 41 of the case 2 permeates the head 31 through the leg 32, and then oozes little by little from the head 31 to the raceway grooves 4 of the track rail 2.

The balls 7 and the raceway grooves 9 are sealed up by means of the tightly-sliding contact of the whole surface 40 of the head 31 with the raceway grooves 4. The leg 32 is of rectangular cross section. Upon assembly of the delivery means 30, or displacement of the head 31 for compensation of wear of the head 31, the leg 32 is movable in a retractile direction, but is retained against rotation around the lengthwise axis of the leg 32. It will be thus understood that the head 31 of the delivery means 30 is kept in steady sliding contact with the raceway grooves 4 of the track rail 2.

Provided on the opposing walls 34 of the recess 33 of the case 21 are openings for accommodating the delivery means 30 therein. The openings are comprised of larger aperture 35 for receiving the heads 31 and smaller aperture 37, merging with each other through stepped potions 36. Mouthpieces 38 of elastic material such as synthetic rubber are provided over the apertures 35, 37 and the stepped portion 36. The mouthpieces 38 each have a bore 39. The leg 32 of the delivery means 30 is inserted through the bore 39 in the case 21 and immersed in lubricant. The elastic mouthpieces 38 each are to seal up the clearance between the delivery means 30 and the opening of the case 21 for preventing leakage of lubricant through the clearance. The mouthpieces 38 also elastically urge the heads 31 of the delivery means 31 towards the raceway grooves 4 of the track rail 2, so that the lubricant may be steadily applied to the raceway grooves 4 and the heads 31 may be forced out in compensation for wear of the sliding surfaces 40 of the heads 31.

With the slider 1 moving along the track rail 2, the lubricant, grease, lubricating oil, or oil component impregnated in powdered resin contained in the cavity 41 of the case 21, permeates through delivery means 30 and is applied to the raceway grooves 4 of the track rail 2. The lubricant applied to the raceway grooves 4 spreads over rolling elements 7 and raceway grooves 9 of the slider 1 to thereby lubricate the rolling elements 7 to smooth the sliding movement of the slider 1 relative to the track rail 2. The elastic mouthpieces 38 constantly urge the heads 31 of the delivery means 30 towards the raceway grooves 4 of the track rail 2 to seal up the raceway grooves 4 for the rolling elements 7. With the lubricant being consumed, the case 21 may be replenished with the lubricant through the feed port 29.

Figure 9:
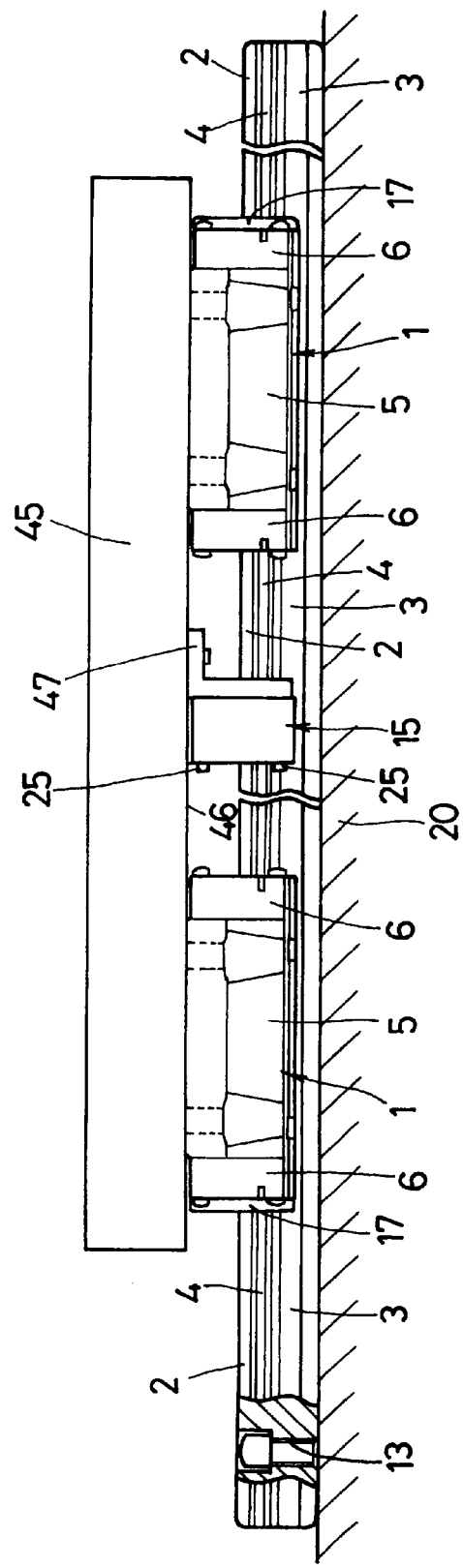
FIG. 9 is a side elevation view showing another embodiment of the linear motion guide unit according to the present invention.

Another embodiment of the present invention shown in FIG. 9 is identical with the embodiment shown in FIGS. 1 and 2, except for the slider 1 and the case 21 of the lubricating means 15 being mounted to the mounting base 45 (such as a table). Like parts in figures are identified by the same reference character and the detailed description is omitted.

Referring now to FIG. 9, the mounting base 45 is provided on its lower surface 46 with mounting jigs 47 by fitting means. The lubricating means 15 is secured to the mounting jigs 47 by fixing means, or bolts 25. When the mounting jigs 47 with the slider 1 move along the track rail 2, the lubricating means 15 also move along the track rail 2 to thereby feed lubricant from the heads 31 of the delivery means 30 to the raceway grooves 4 of the track rail 2. In case a plurality of sliders 1 straddle the track rail 2, the lubricating means 15 may be constructed so as to move along the track rail 2 independently of the mounting base 45. According to this arrangement, the slider 1 may move under the influence of the slider 1 abutting against the lubricating mean 15.

Although the linear motion guide unit of the present invention has been described with reference to the preferred embodiments shown in FIGS. 1 to 9, it is understood that the present disclosure of the preferred form has been changed in details of construction and the combination and arrangement of parts may be resorted to without departing from the spirit and the scope of the invention as hereinafter claimed.

Alternatively, washers of thin steel plate may be provided between the end cap 6 and the case 21 for prevention of deformation of the end caps 6 and cases 21 caused by the tightening force of the bolts 25. Whereas the head 31 in the embodiments shown above was of semi-cylindrical configuration, the head may have a curved tip of a cylinder having a generating line along the axial line of the leg 32. Further, the embodiments described above had the rolling elements, or balls 7, and the raceway grooves 4 each has the arc cross section, whereas the rolling elements 7 may be roller and the head 31 of the delivery means 30 may have the surface 4- of a configuration corresponding to the rollers.

The linear motion guide unit of the present invention is suitable for facilities where the escaped lubricant should be disposed of without delay, such as clean rooms for semiconductor manufacturing machines; where the operating environment should be kept from pollution with oil; food facilities where oily material should be flushed away; and wood working facilities where dust absorbs oily material. The guide unit of the present invention achieves good lubrication for a long maintenance-free life-time, except the replenishment of lubricant.

What is claimed is:

1. A linear motion guide unit comprising
   a track rail provided on lengthwise side surfaces thereof with first raceway grooves,
   a sliding element movable relative to the track rail and including second raceway grooves in opposition to the first raceway grooves, and
   lubricating means provided in the sliding element for lubricating the first raceway grooves of the track rail,
   wherein the lubricating means comprise a case for lubricant and lubricant delivery means provided to the case, and
   wherein the lubricant delivery means make sliding contact with the first raceway grooves of the track rail to thereby supply the lubricant to the first raceway grooves of the track rail,
   wherein the delivery means comprises a head disposed in sliding contact with the first raceway grooves of the track rail, and a leg integral with the head and extending through an opening into the case,
   wherein the leg of delivery means is inserted into the case through an elastic mouthpiece, and
   wherein the head of the delivery means is elastically urged towards the raceway grooves of the track rail by means of the elastic mouthpiece.

2. A linear motion guide unit according claim 1, wherein the case of the lubricating means is secured to the sliding element and the lubricating means is arranged for sliding movement on the track rail.

3. A linear motion guide unit according to claim 1, wherein the case of the lubricating means is secured to a mounting base on which the sliding element is fixed and the lubricating means is arranged for sliding movement on the track rail.

4. A linear motion guide unit according to claim 3, wherein a plurality of sliding elements are arranged for sliding movement on the track rail, the sliding elements being fixed to the mounting base, and the lubricating means is arranged between adjacent sliding elements.

5. A linear motion guide unit according to claim 1, wherein the sliding element comprises a casing provided with said second raceway grooves in opposition to the first raceway grooves, rolling elements movable between the opposed first and second raceway grooves, end caps secured to the end surfaces of the casing, the case of the lubricating means being secured on any one of the end caps, and an end seal secured on the case.

6. A linear motion guide unit according to claim 5, comprising a said lubricating means at each said end surface of the casing, wherein the end caps, the cases and the end seals are secured to the casing by bolts which are screwed into openings in the casing through openings in the end caps, the end seals and the case.

7. A linear motion guide unit according to claim 6, wherein collars are provided in the openings in the case, the bolts are inserted through the collars.

8. A linear motion guide unit according to claim 1, wherein the case of the lubricating means is provided with a port which serves as a lubricant feed port and a vent hole.

9. A linear motion guide unit according to claim 1, wherein the delivery means of the lubricating means is composed of porous sintered resin.

10. A linear motion guide unit according to claim 9, wherein the porous sintered resin is fabricated by the steps of filling a mold with powdered synthetic resin of fine grain size, and heating the molded resin.

11. A linear motion guide unit according to claim 1, wherein the head of the delivery means has a sliding surface of a configuration correspondent with the cross section of the raceway grooves, and the leg is held in the opening against rotation.

12. A linear motion guide unit according to claim 1, wherein the lubricant is any one of grease and lubricating oil.

13. A linear motion guide unit according to claim 1, wherein the lubricant is mixed with any one of powdered resin, powdered metal and felt.

* * * * *